United States Patent [19]

Coquillart

[11] 4,387,504
[45] Jun. 14, 1983

[54] MACHINE FOR FLATS OR CONICAL WINDINGS IN THE FORM OF A DISC FOR ELECTRIC MOTORS

[75] Inventor: Michel Coquillart, Saint Etienne Terrenoire, France

[73] Assignee: Mavilor Systemes, Switzerland

[21] Appl. No.: 209,293

[22] Filed: Nov. 21, 1980

[30] Foreign Application Priority Data

Dec. 5, 1979 [FR] France .................................. 79 30267

[51] Int. Cl.³ ............................................. B21F 3/00
[52] U.S. Cl. .................................... 29/598; 140/92.2
[58] Field of Search .......................... 140/92.1, 92.2; 242/7.04; 29/598

[56] References Cited

U.S. PATENT DOCUMENTS

| | | | |
|---|---|---|---|
| 678,280 | 7/1901 | Riddell | 140/92.2 |
| 2,177,260 | 10/1939 | Laube | 140/92.2 |
| 3,550,645 | 12/1970 | Keogh | 140/92.2 |
| 3,599,680 | 8/1971 | Burr | 140/92.2 |

Primary Examiner—Lowell A. Larson
Attorney, Agent, or Firm—Eric P. Schellin

[57] ABSTRACT

Continuous rotation is imparted to a coil holder about its rotational axis carried by a cam assembly to which rotation is intermittently imparted about a second offset rotational axis through a clutch-brake mechanism. The cam assembly controls operation of a wire-guide mechanism through which wire is fed to the coil holder to form a dynamo-electric machine winding having a particular geometrical configuration.

33 Claims, 13 Drawing Figures

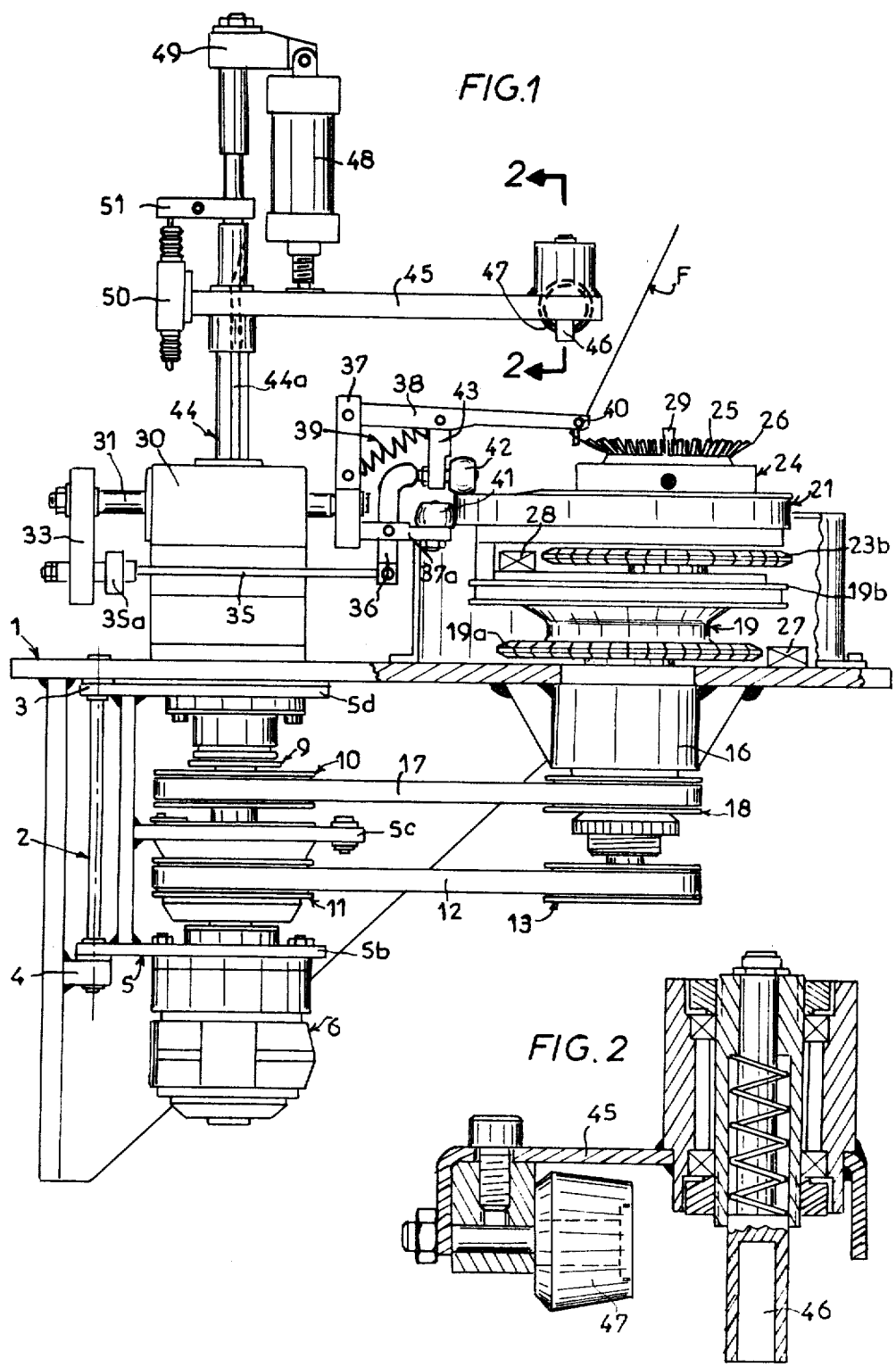

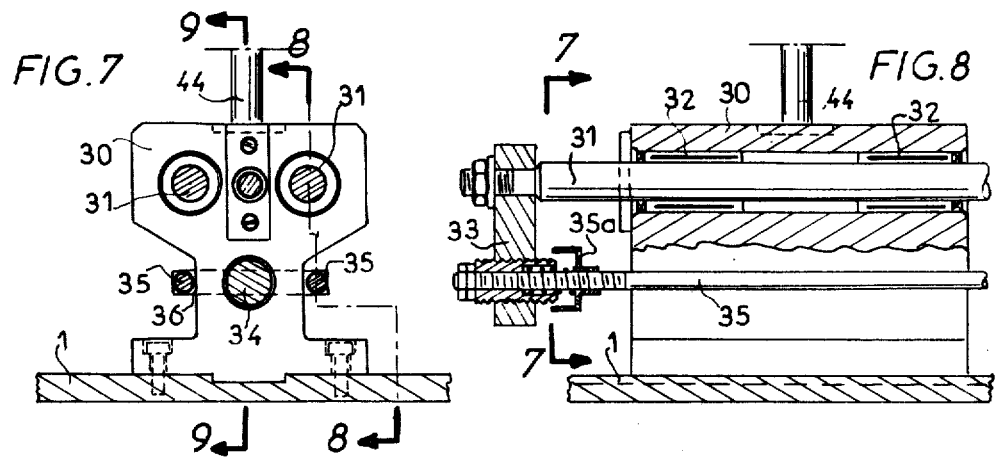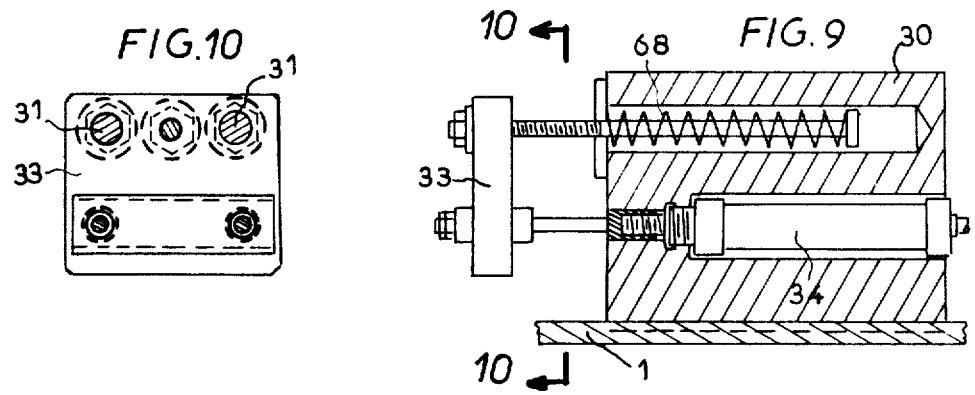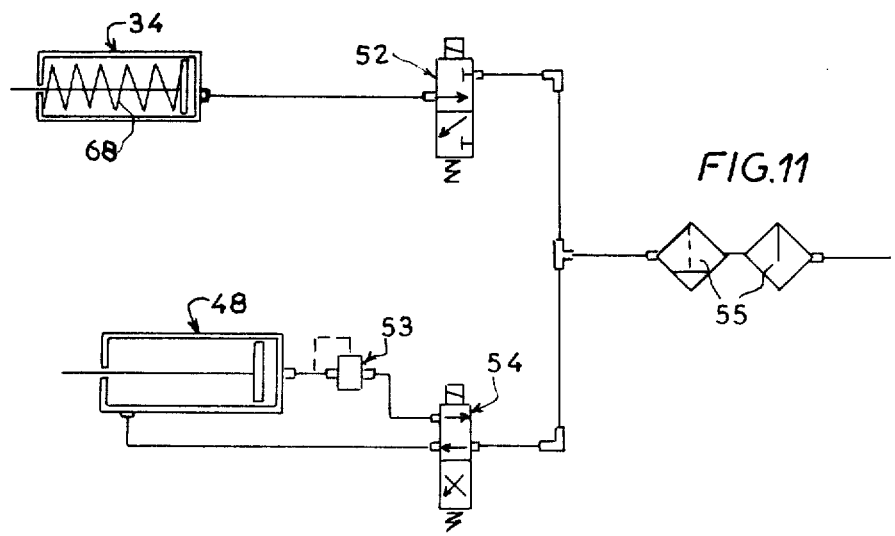

MACHINE FOR FLATS OR CONICAL WINDINGS IN THE FORM OF A DISC FOR ELECTRIC MOTORS

BACKGROUND OF THE INVENTION

The invention relates to dynamoelectrical machines, and more particularly means and methods for the manufacture of the motor windings of such machines.

The object of the invention is to provide a machine which is simple, economical and reliable, adapted to form automatically the windings of a flat or conical rotor in the shape of a disk, such windings being heretofore formed manually.

SUMMARY OF THE INVENTION

In accordance with the invention a coil winding machine includes a table, bracket support or framework on which a clutch-brake motor assembly is pivotally mounted to drive through a transmission assembly, either a cam-bearing plate and a coil-bearing plate, or the coil-bearing plate only, which is equipped for receiving the wires making up the coils of the rotor and guided by a wire-guide actuated by the cam of the first plate. The various components and controls of the machine are interrelated for continuous and automatic production of windings which are adjustable in trapezoidal sections and in the offsetting and extend like a crown, with dead turns in the center for connection with the commutator, the windings or coils being thereafter interassembled by a coil-bonding device which is integral with the framework.

BRIEF DESCRIPTION OF DRAWING FIGURES

The foregoing and other characteristics will be apparent from the following description of the invention, illustrated more fully by way of example in the annexed drawings, in which:

FIG. 1 is a side elevation view showing the winding machine according to the invention together with plating means for the windings being formed, illustrated in a displaced position for the sake of clarity as will be explained hereafter;

FIG. 2 is a sectional view on a larger scale, taken along the section line 2—2 of FIG. 1, showing the plating means of the coils in the course of manufacture on the coil-holder;

FIG. 7 is a sectional view taken along the section line 7—7 of FIG. 8, showing the bearing-support of the wire-guide;

Figure 12:
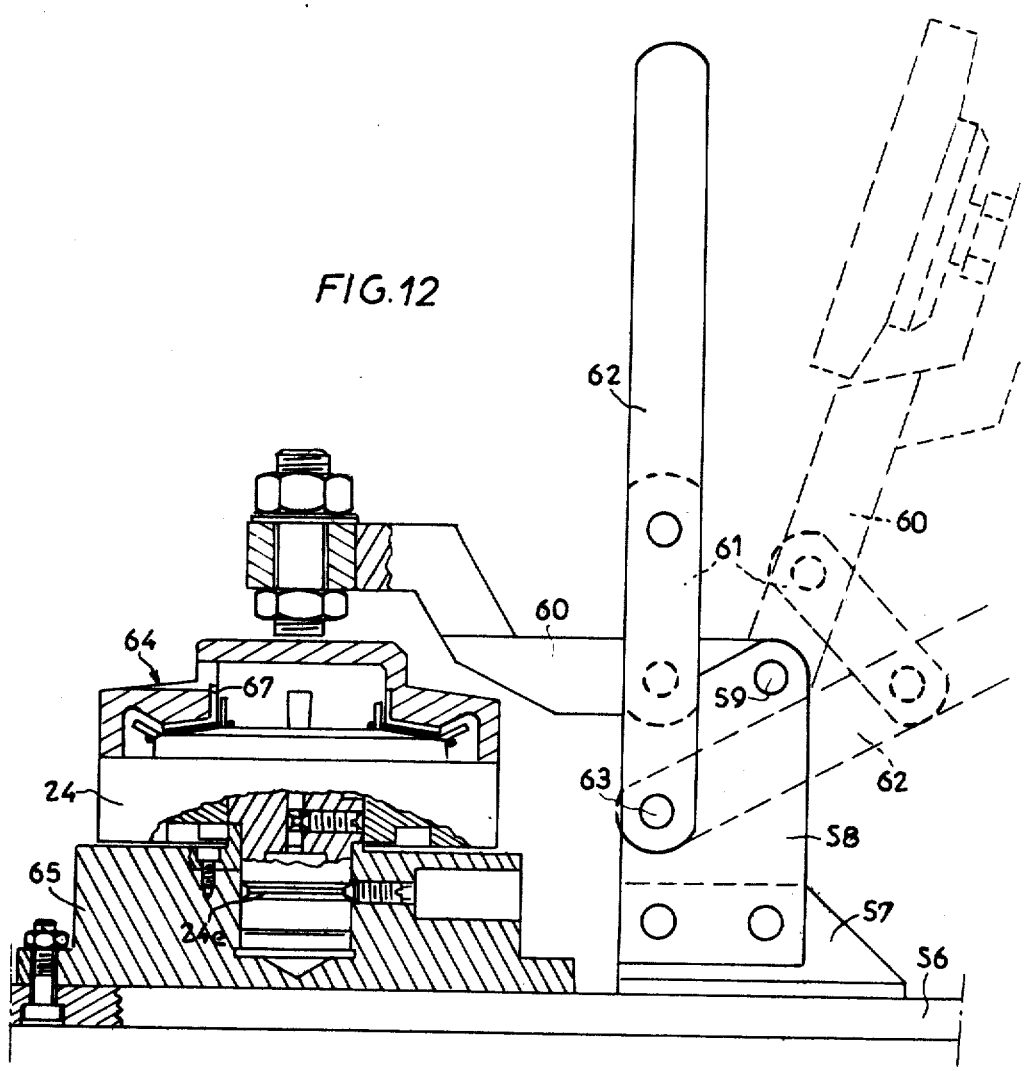
Figure 13:
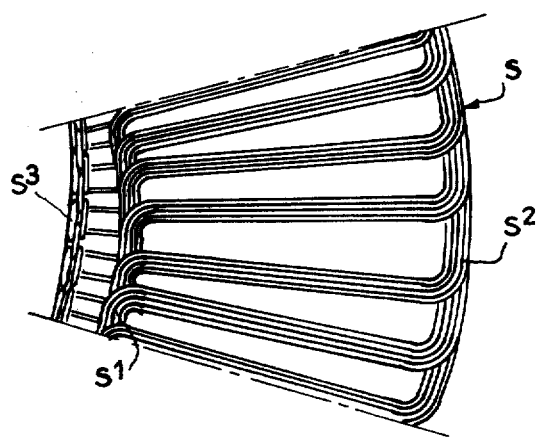

FIGS. 8 and 9 are sectional views taken along the section lines 8—8 and 9—9 of FIG. 7, respectively, showing the bearing-support and the controls for the wire-guide;

FIG. 10 is a sectional view taken along the line 10—10 of FIG. 9, showing the connecting organs of the wire-guide control;

FIG. 11 is a diagram illustrating the pneumatic control circuit of the pressure cylinders for the wire-guide and the plating means;

FIG. 12 is a sectional view in part, on a larger scale illustrating an embodiment of the presser tool in accordance with the invention;

FIG. 13 is a plan view in part, showing a portion of a winding produced by the winding machine in accordance with the invention.

DETAILED DESCRIPTION OF PREFERRED EMBODIMENT

Figure 3:
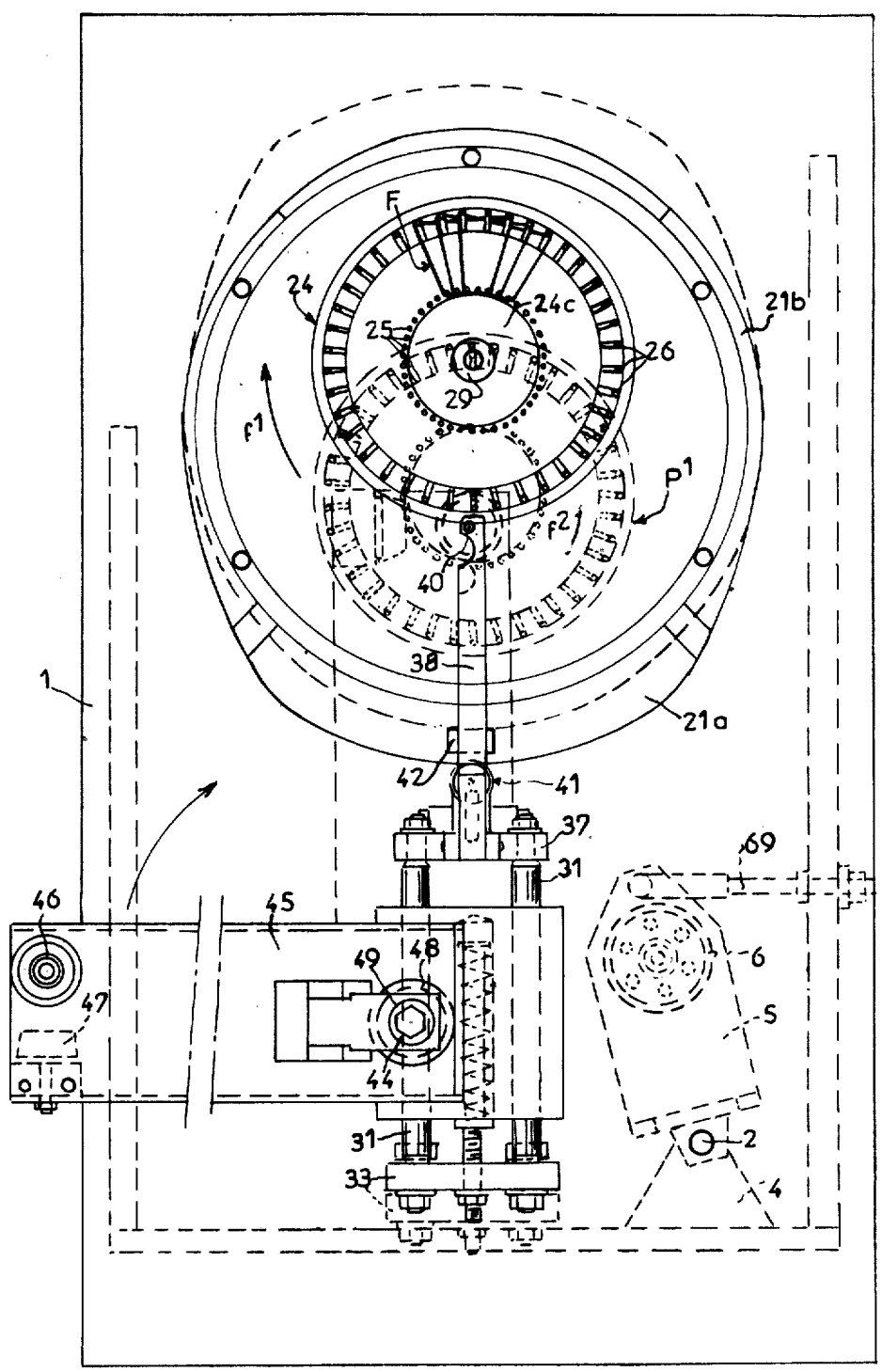
FIG. 3 is a plan view of the winding machine, showing the coil-bearing plate, the wire-guide, and the means for retaining the coils in two different positions.

The winding machine in accordance with one embodiment of the invention, as illustrated in FIG. 1, consists substantially of a framework, bracket support of table 1, braced by an angle bracket. In the corner of the angle bracket, a spindle 2 mounted by bearings 3 and 4 is pivotally connected to a support 5 consisting of an upright 5a and of three platens 5b–5c–5d. The support 5 is connected tensionally with the framework by means of a tie-bar 69 as shown in FIG. 3.

Figure 6:
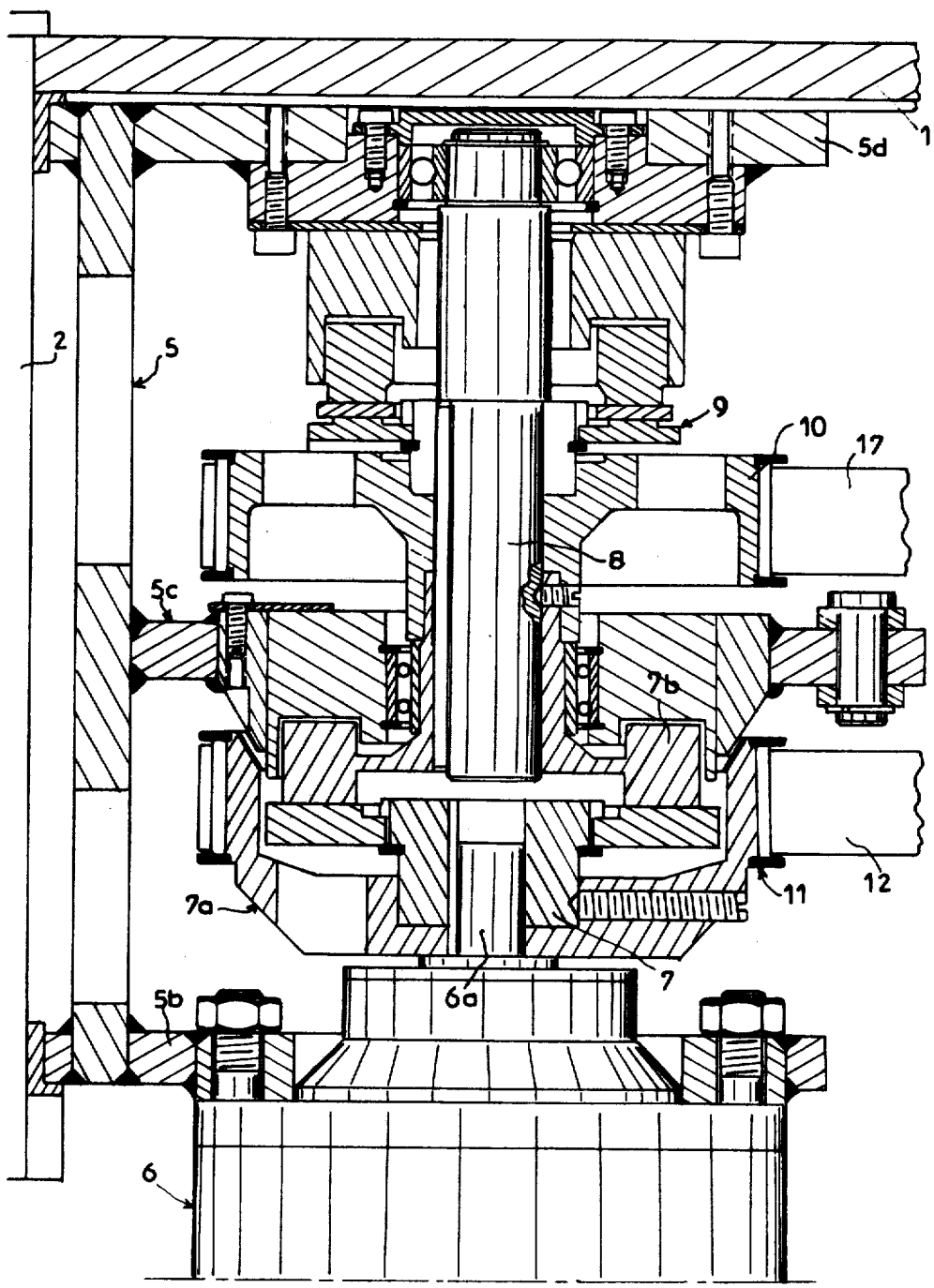
FIG. 6 is a sectional view on a large scale, illustrating the clutch-brake-motor assembly.

The lower platen 5b supports the drive motor 6 the output shaft 6a of which (FIG. 6) drives the pulley 11, while the part 7b of a clutch 7 is coupled to a shaft 8 and is thereby rotated within the central platen 5c.

The shaft 8 is also guided for free rotation on the upper platen 5d on which a brake 9 is supported for stopping pully 10 coupled to the shaft 8 and connected to the part 7b of the clutch.

Figure 4:
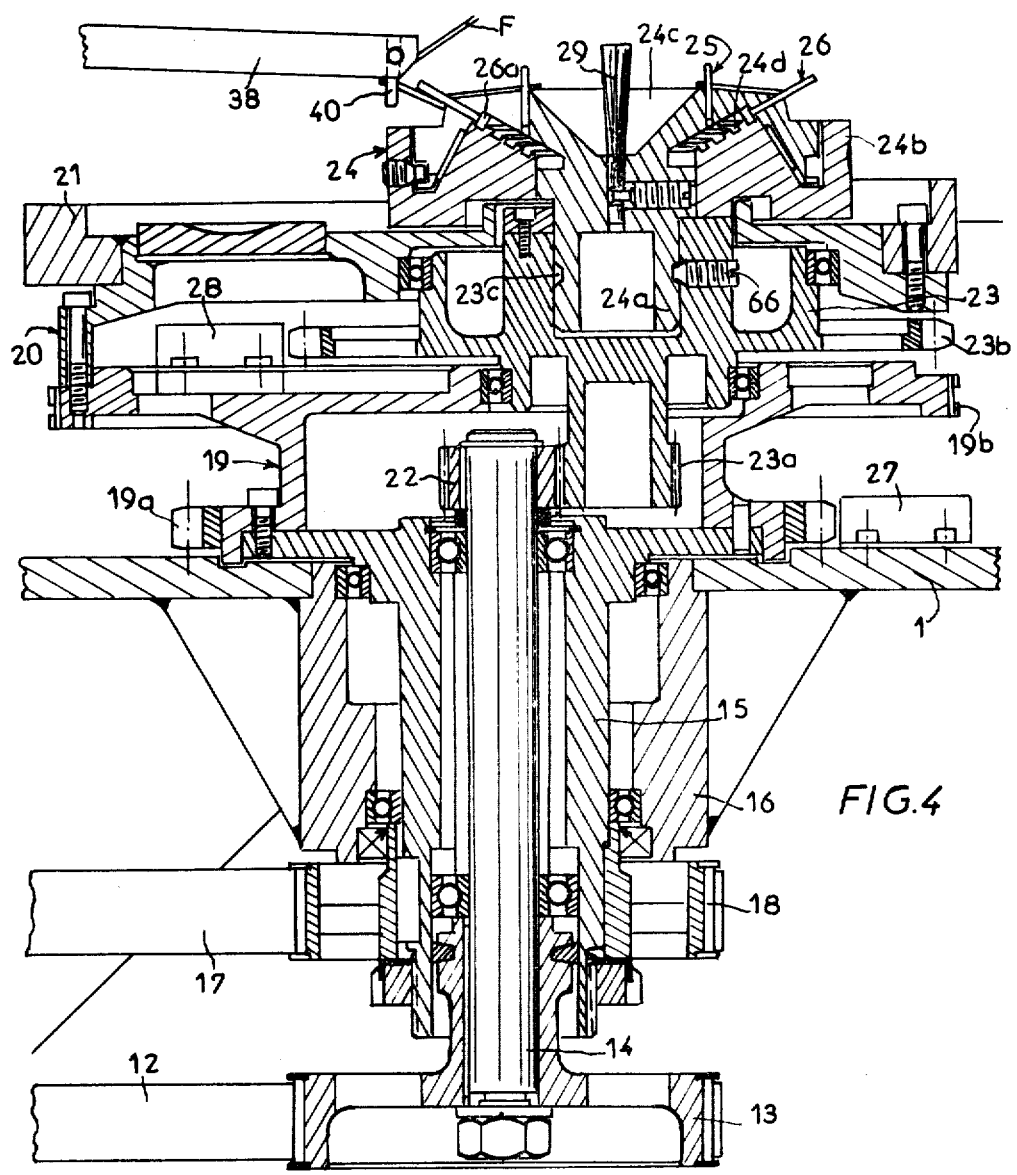
FIG. 4 is a sectional view on a larger scale of the coil-bearing and cam-bearing plates, as well as a sectional view of the driving means thereof, which are shown in the operational position.

The pulley 11, which is always rotated together with the motor, drives by means of the belt 12 a pulley 13 which is coupled to the end of a shaft 14 rotating in turn within a sleeve 15 which is in turn mounted for rotation in a bearing 16 secured to the bracket support 1 (FIG. 4).

The pulley 10, when the clutch is engaged, drives by means of a belt 17 a pulley 18 which is coupled to the lower part of the sleeve 15, which supports at the upper part a rotating plate 19 which is in turn connected with a cam-bearing plate 20. Plate 20 supports a cam 21 with a double profile, i.e. a peripheral vertical profile and a horizontal profile at the upper part.

The upper part of the shaft 14 is coupled to a gear 22 meshing with another gear 23a integral with a hub 23 in which there is mounted the part 24a of a coil holder 24 supporting coils or windings to be made between part 24a and a peripheral part 24b, as well as on the part 24a.

The coil supports as shown in FIG. 4 are formed by two types of needles, namely: a plurality of needles 25 set vertically and at the same radial distance from the center of the part 24a of the plate around a cup 24c, and a plurality of needles 26 slanting externally from the part 24a of the plate with the needle heads 26a engaging a spiral groove 24d of the part 24b, *so that the head can be retracted or shifted by rotation of said part 24b relative to the part 24a.*

The hub 23 and the rotating plate 19 also have toothed crowns 23b and 19a, the purpose of which is to be rotated in front of count sensors 27 and 28 connected to the cabinet for controlling and registering rotation.

The sensor 28 is electrically connected to a conductor rim 19b on the plate 19, in contact with brushes (not shown) for conducting electric current to cabinet mounted equipment.

In the middle of the cup 24c is mounted a tapered spindle 29 protruding above the plate 24. The smaller diameter of spindle 29 is directed downward for reasons which will be explained hereafter.

It will be noted that the winding machine may have several coil-bearing plates and several interchangeable cams with a double profile, in order to produce windings with varied dimensional characteristics.

A wire-guide having a bearing block 30 cooperates with the coil holder 24 and the cam 21 in order to produce the winding and is secured on the bracket support 1 (FIG. 7). Two slides 31 are passed through the upper part of block 30 having ball slide bearings 32 (FIG. 8). The slides 31 are fixed at the rear to a connecting plate 33 biased by return spring 68 and attached to a piston rod 35 of a single acting pressure cylinder 34 housed within the block 30 as shown in FIG. 9 for disengaging the wire-guide from the cam (FIG. 8) against the action of the spring 68.

Rods 35 (FIGS. 8 and 10) are attached laterally to the bottom of the connecting plate and pass on either side of the bearing block 30; they are elastically connected at 35a to a crossbar 36 which is journaled on the projection 37a of a head 37 secured to the end of the slides 31 (FIG. 1).

An arm 38 maintained by spring 39 in the lower position and provided at the end with a wire-guide means 40 is also hingedly supported by the head 37, at the upper part thereof.

The projection 37a of the head 37 supports at the end thereof for free rotation a roller 41 abutting the peripheral contour of the cam 21, while a further roller 42 is supported for rotation by a support 43 pivoted on the arm 38 and abutting the upper profile of the cam 21 (FIG. 1). The rotational axis of the roller 42 is established through a roller shaft abutting a curved upper end of the crossbar 36.

The bearing block 30 supports on its upper face a column 44 on which there is pivotally mounted a jib 45 (FIGS. 1, 2 and 3) the free end of which is equipped with a hollow finger 46 urged elastically downward to cap the spindle 29 during certain operational stages. The end of the jib 45 also rotatably supports a roller 47 operative during certain operational stages to stack the formed coils or windings.

The jib 45 is vertically adjustable by means of a double acting pressure cylinder 48 which hangs on a yoke 49 secured to the top of the column 44 and fastened to the jib.

Operation of the pressure cylinder 48 causes the jib to be lowered or raised and swivelled by connection with spiral ramp 44a on the column (FIG. 1), the travel of the jib being controlled by a contactor 50 integral with the jib. The contact rods of contactor 50 abut alternately the bearing block 30 and a stop 51 adjustably secured to the column 44 (FIG. 1).

The diagram of the pneumatic system for controlling the wire-guide and the coil presser means has been illustrated in FIG. 11. It will be seen from this diagram that the pressure cylinder 34 for disengaging the wire-guide is connected to an electro-valve 52, while the pressure cylinder 48 for positioning the jib 45 supporting the coil presser-roller 47 is connected through a flow reducing valve 53 to an electro-valve 54. The two circuits are joined to go to the air net while passing through two filters 55.

The coil bonding device integral with the table 1 is illustrated in FIG. 12. This device includes a base plate 56 secured to the table and supporting a shoe 57 for the fastening of a yoke 58 to which a support-arm 60 is pivoted at 59, this support-arm being connected by a link 61 to an operational lever 62 pivotally connected to the yoke 53 at 63.

The free end of the arm 60 mounts a cap 64, for capping the coil holder 24, positioned on a base 65 after being removed from the hub 23 of the winding machine on which it is normally mounted and detachably retained by means of a needle screw 66 engaged within a groove 24e of the holder (FIG. 4).

It will be noted that the device can be arranged to act directly on the coil holder still positioned on the hub 23.

A crown 67 of insulating material, corresponding to the location of the coils, is supported internally by the cap 64. A current sufficiently high is allowed to flow through the winding wire, in order to achieve a connection of the coils by the softening of the insulating resin which surrounds the wire.

The operation of the winding machine in accordance with the invention will be described now, more particularly with reference to the FIGS. 1, 3, 4 and 5 of the drawings.

To begin with, the coil holder 24 shown in dotted line is placed as illustrated at P1 in FIG. 3, i.e. in the nearmost location within reach of the wire-guide approximately above the vertical needles 25. The winding wire F is led into the wire-guide and attached to the conical spindle 29.

The driving motor 6 is then energized, and through the clutch 7 drives the pulleys 10 and 11 which in turn drive the pulleys 13 and 18. The plate 19 and the coil holder 24 (arrow f1, FIG. 3) are thereby rotated together. During such movement, the wire is passed behind several needles 25 (the number thereof is in accordance with the dimensional section which has been selected for the coils or windings). As the coil holder 24 is also driven in reverse (arrow f2, FIG. 3), by the pulleys 11 and 13 and the gears 22 and 23a having the same tooth number, the coil holder is therefore fixed in rotation and has an orbital motion only around the axis of the cam-bearing plate 20. The wire F is directed toward the outside of the coil holder and is passed in front of the slanting needles 26, and then returned to the starting point on a vertical needle 25. At this very moment, the wire-guide 30 is driven by its spring 68 toward the center of the coil holder 24 in order to allow the wire to be passed around the conical spindle 29 while forming thus a dead turn which is necessary for the subsequent connection of the wire with the blade commutator by cutting the loop of the dead turn.

When the coil or winding is made, the brake 9 is engaged to prevent the pulleys 10 and 18 from rotation together with the clutch. The pulleys 11 and 13 only continue to rotate, and drive the coil holder only through the gears 22 and 23a (FIG. 4). Such rotation of the coil holder alone takes place at a given phase, in order to provide a determined offset for the next coil. The cycle is then repeated under the same conditions as previously, up to the formation of all the superimposed coils, generally in trapezodial sections, on the one hand in several layers or in stacking, and on the other hand in offset relationship between each stack (FIG. 3).

During the formation of a coil, the cam 21 with double profile is acting on the follower rollers 41 and 42 in order to modify the position of the wire-guide, on the one hand radially to negotiate the distance between the needles 25 and 26, and vertically on the other hand, (the sector 21a of the cam is higher than the complementary sector 21b, FIG. 3), to form peripherally, internally and externally, a turning up of the coils S constituting rigidity beads S1 and S2 which will be covered, in the same way as the remaining surface of the coils, by an appropriate resin (see FIG. 13).

It will be noted that the coiling or winding conditions (offsetting of the coils, number of coils. . . ) are detected through the gears 19a and 23b by the count sensors 27 and 28 and by the cooperation of the coil holder 24 and cam-bearing plates 20.

When a coil is completed, the normally idle jib 45, in the position illustrated by a full line in FIG. 3, is pivoted clockwise as shown by the arrow and lowered, by operation of the pressure cylinder 48 and the ramp 44a of the column 44, such movement being limited by the contactor 50. In this respect, it will be noted that in FIG. 1, for the sake of clarity, the jib 45 while shown in the angular working position (position in dotted lines of the FIG. 3), is however shown raised to the normal nonworking position.

Figure 5:
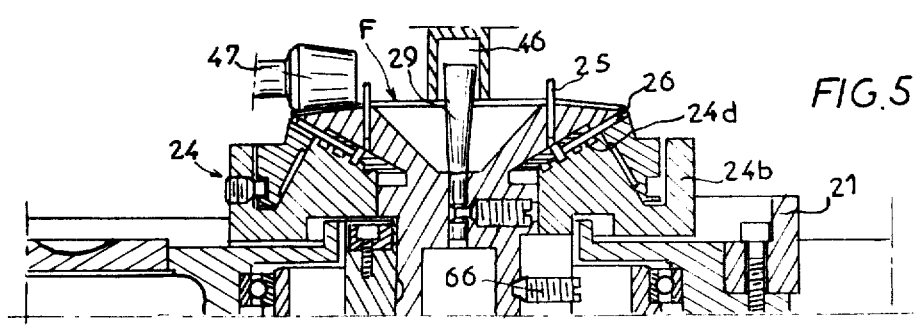
FIG. 5 is a sectional view in part of the coil-bearing plate shown in the abutting position of the plating means for the coils or windings, and prior to the dismantling of the plate.

When the jib is in the working position, the conical spindle 29 is capped by the hollow finger 46 which prevents the escape of the dead turns S3, while the roller 47 of the jib is urged hard on the coils, so that a flat disk will be formed by the coiling (FIG. 5).

The coils or windings formed in this manner are then interassembled, as set forth previously, by the presser tool 64 previously described, either at the location of the coil holder 24, or on the coil holder removed and disposed on the base 65 as shown in FIG. 12.

To remove the coiling from the coil holder, it is merely necessary to allow the part 24a to be rotated, for the removal of the slanting needles 26 engaged within the spiral groove 24d, and consequently free the coils or windings.

The advantages will be clearly apparent from the foregoing description with the following more particularly pointed out:

The winding of the flat commutators made rationally and economically by means of an automatic machine, the construction of which is sturdy and reliable, with the use of simple and successful technological components.

The embodiment of windings of various definitions thanks to the many possible adjustments (number of coils, size of the coils . . . ).

The economical interassembly of the coils by the softening of the resin which surrounds the wires, by means of the presser tool, which eliminates time-consuming and expensive operations of tying with textile yarns and other means, at the periphery of the coiling, near the center and in the medial part.

The simplification of the subsequent steps of assembly to the commutator, by the positioning of the wires going out at the center in the form of dead turns which is sufficient to cut and to connect to the commutator.

The invention is neither restricted to the use nor to the forms of the embodiment which has been more particularly described and illustrated and any alternative form or embodiments remain within the scope of the invention.

I claim:

1. In a machine for making dynamo-electric windings, having a rotatable coil holder (24) and wire distributing means radially displaceable relative to the coil holder for continuous formation of winding coils from wire (F) fed thereto, the improvement comprising rotatable cam means (20-21-41-42) engageable with the wire distributing means for said displacement thereof, a drive motor (6), transmission means (10-11-12-13-17-18-22-23a) drivingly connecting the motor to the cam means and the coil holder for rotation thereof, and clutch-brake control means (7-9) operatively connected to the transmission means for alternatively imparting said rotation to both the cam means and the coil holder or to the coil holder alone, to adjustably form the winding coils (S) in offset trapezoidal sections extending in conical relation to radially inner dead turns (S3) about a winding center.

2. The machine as defined in claim 1 including presser tool means (64) engageable with the sections of the winding coils for flattening thereof.

3. The machine as defined in claim 2 wherein the cam means includes a cam-bearing plate (20), a double profile cam member (21) mounted on the plate, and follower means (41-42) engageable with the cam member for displacing and operating the wire distributing means in phased relation to said rotation of the coil holder.

4. The machine as defined in claim 3 including a frame (1), a support (5) pivotally mounted on the frame having three platens (5b-5c-5d), said clutch-brake control means including a clutch (7) through which the transmission means drives the cam means and a brake (9) operative through the transmission means to hold the cam means stationary when the clutch is disengaged, said drive motor, the clutch and the brake being respectively supported on the three platens of the support, and drive enabling means (69) interconnected between the support and the frame for maintaining the transmission means effective to impart rotation to the coil holder and the cam means.

5. The machine as defined in claim 4 wherein said drive motor is suspended from a lowermost of the three platens (5b), the brake being suspended from an uppermost of the platens (5d) and the clutch being supported by the platen (5c) intermediate the lowermost and uppermost platens, a rotatable shaft (8) interconnecting the clutch and the brake and means (6a-7a) for coupling the clutch to the drive motor.

6. The machine as defined in claim 5 wherein the transmission means includes a first drive pulley (11) connected to the coupling means, a second drive pulley (10) connected to the rotatable shaft (8) in coaxial relation to the first drive pulley, a pair of coaxial driven pulleys (13-18) respectively coupled to the coil holder and the cam-bearing plate and a pair of drive belts (12-17) respectively interconnecting the drive pulleys with the driven pulleys.

7. The machine as defined in claim 6 wherein the transmission means further includes a driven shaft (14) connected to one of the coaxial driven pulleys (13) in offset relation to the coil holder and in coaxial relation to the cam-bearing plate, and gear means (22-23a) drivingly connecting the driven shaft to the coil holder for rotation and orbital movement thereof during rotation of the cam-bearing plate.

8. The machine as defined in claim 7 wherein the coil holder includes an upper portion, a downwardly tapering spindle (29) projecting from said upper portion through which a rotational axis of the coil holder extends and about which the dead turns of the winding coils are wound after completion of the sections of the winding coils, a plurality of vertical needles (25) projecting from the upper portion in equally spaced circumferential relation to the spindle parallel to the rotational axis, and a plurality of inclined needles (26) projecting from the upper portion in diverging relation to each other equal in number and distribution to the vertical needles, and wire distributing means cyclically displaceable by the cam means for guiding wrapping of the wire (F) about the spindle and the needles to form the trapezoidal sections of the winding coils (S).

9. The machine as defined in claim 8 wherein the coil holder further includes a hub (24a) on which the upper portion is formed and an angularly adjustable member (24b) mounted on the hub having spiral grooves (24d) formed therein, said inclined needles having heads received in the grooves and being adjustably retracted in response to angular adjustment of the member relative to the hub.

10. The machine as defined in claim 9 wherein said cam member is provided with a radial profile surface and an axial profile surface, said profile surfaces being respectively engageable by the follower means for horizontal and vertical displacement of the wire distributing means.

11. The machine as defined in claim 10 wherein the wire distributing means includes a bearing block (30) mounted on the frame, slide means (31-39) mounted by the block and connected to the follower means for maintaining engagement thereof with the radial profile surface of the cam member, a wire-guide arm (38) pivotally mounted on the slide means and connected to the follower means, spring means (39) for biasing the guide arm to a lowered position in which the follower means engages the axial profile surface of the cam member and fluid pressure operated means connected to the slide means for retraction of the follower means from the cam member, said follower means including a first roller (41) mounted on the slide means and engageable with the radial profile surface of the cam member and a second roller (42) pivotally suspended from the guide arm and engageable with the axial profile surface of the cam member, and lever means (36) pivotally connected to the slide means and abutting the second roller for disengagement thereof during retraction.

12. The machine as defined in claim 11 including a vertical column (44) fixed to the bearing block, a support jib (45), means (44a) mounting the jib on the column for vertical and angular displacement, fluid pressure operating means (48) connected to the jib for effecting said displacement thereof, cap means (46) carried on the jib for retaining the dead turns (S3) formed on the spindle (29), roller means (47) carried on the jib for exerting pressure on the offset sections of the winding coils (S) when formed in overlapping relation to each other on the hub of the coil holder, and means (50-51) for limiting vertical travel of the jib on the column.

13. The machine as defined in claim 12 including sensor means (19a-23b-27-28) for measuring rotational movement of the coil holder and the cam means.

14. The machine as defined in claim 13 wherein said sensor means includes an externally toothed disk (23b) connected to the coil holder and rotatable therewith about the rotational axis thereof, a signal generating detector (28) mounted on the cam means in close radially spaced relation to the toothed disk, and a contact ring (19b) electrically connected to the detector through which rotation sensing signals are transmitted.

15. The machine as defined in claim 14 wherein said presser tool means includes a cap (64), a pivoted arm (60) mounted on the frame, and actuating lever means (62) connected to the arm for displacement of the cap between a lowered position on the coil holder and a retracted position.

16. The machine as defined in claim 15 wherein the presser tool means further includes an annular insulating liner (67) in the cap (64) engageable with the winding coils during flow of electrical heating current therethrough, said wire from which the coils are formed having an insulating resin sheathing softened by the heating current to interconnect the coils at locations in contact with the liner under pressure of the cap.

17. The machine as defined in claim 1 including a frame (1), a support (5) pivotally mounted on the frame having three platens (5b-5c-5d), said clutch-brake control means including a clutch (7) through which the transmission means drives the cam means and a brake (9) operative through the transmission means to hold the cam means stationary when the clutch is disengaged, said drive motor, the clutch and the brake being respectively supported on the three platens of the support, and drive enabling means (69) interconnected between the support and the frame for maintaining the transmission means effective to impart rotation to the coil holder and the cam means.

18. The machine as defined in claim 17 wherein said drive motor is suspended from a lowermost of the three platens (5b), the brake being suspended from an uppermost of the platens (5d) and the clutch being supported by the platen (5c) intermediate the lowermost and uppermost platens, a rotatable shaft (8) interconnecting the clutch and the brake and means (6a-7a) for coupling the clutch to the drive motor.

19. The machine as defined in claim 18 wherein the transmission means includes a first drive pulley (11) connected to the coupling means, a second drive pulley (10) connected to the rotatable shaft (8) in coaxial relation to the first drive pulley, a pair of coaxial driven pulleys (13-18) respectively coupled to the coil holder and the cam-bearing plate and a pair of drive belts (12-17) respectively interconnecting the drive pulleys with the driven pulleys.

20. The machine as defined in claim 1 wherein the cam means includes a cam bearing plate (20), a double profile cam member (21) mounted on the plate, and follower means (41-42) engageable with the cam member for displacing and operating the wire distributing means in phased relation to said rotation of the coil holder.

21. The machine as defined in claim 1 wherein the cam means and the coil holder have offset rotational axes, said transmission means including a driven shaft (14) through which the rotational axis of the cam means extends, and gear means (22-23a) drivingly connecting the driven shaft to the coil holder for orbital movement thereof about the driven shaft.

22. The machine as defined in claim 15 wherein the coil holder includes an upper portion, a downwardly tapering spindle (29) projecting from said upper portion through which a rotational axis of the coil holder extends and about which the dead turns of the winding coils are wound after completion of the sections of the winding coils, a plurality of vertical needles (25) projecting from the upper portion in equally spaced circumferential relation to the spindle parallel to the rotational axis, and a plurality of inclined needles (26) projecting from the upper portion in diverging relation to each other equal in number and distribution to the vertical needles, said wire distributing means being cyclically displaceable by the cam means for guiding wrapping of the wire (F) about the spindle and the needles to form the trapezoidal sections of the winding coils (S).

23. The machine as defined in claim 22 wherein the coil holder further includes a hub (24a) on which the upper portion is formed and an angularly adjustable member (24b) mounted on the hub having spiral grooves (24d) formed therein, said inclined needles having heads received in the grooves and being adjustably retracted in response to angular adjustment of the member relative to the hub.

24. The machine as defined in claim 20 wherein said cam member is provided with a radial profile surface and an axial profile surface, said profile surfaces being respectively engageable by the follower means for horizontal and vertical displacement of the wire distributing means.

25. The machine as defined in claim 17 wherein the cam means includes a cam bearing plate (20), a double profile cam member (21) mounted on the plate, and follower means (41-42) engageable with the cam member for displacing and operating the wire distributing means in phased relation to said rotation of the coil holder.

26. The machine as defined in claim 25 wherein the wire distributing means includes a bearing block (30) mounted on the frame, slide means (31-39) mounted by the block and connected to the follower means for maintaining engagement thereof with the radial profile surface of the cam member, a wire-guide arm (38) pivotally mounted on the slide means and connected to the follower means, spring means (39) for biasing the guide arm to a lowered position in which the follower means engages the axial profile surface of the cam member and fluid pressure operated means connected to the slide means for retraction of the follower means from the cam member, said follower means including a first roller (41) mounted on the slide means and engageable with the radial profile surface of the cam member and a second roller (42) pivotally suspended from the guide arm and engageable with the axial profile surface of the cam member, and lever means (36) pivotally connected to the slide means and abutting the second roller for disengagement thereof during retraction.

27. The machine as defined in claim 26 including a vertical column (44) fixed to the bearing block, a support jib (45), means (44a) mounting the jib on the column for vertical and angular displacement, fluid pressure operating means (48) connected to the jib for effecting said displacement thereof, cap means (46) carried on the jib for retaining the dead turns (S3) formed on the spindle (29), roller means (47) carried on the jib for exerting pressure on the offset sections of the winding coils (S) when formed in overlapping relation to each other on the hub of the coil holder, and means (50-51) for limiting vertical travel of the jib on the column.

28. The machine as defined in claim 1 including sensor means (19a-23b-27-28) for measuring rotational movement of the coil holder and the cam means.

29. The machine as defined in claim 28 wherein the cam means and the coil holder have offset rotational axes, said transmission means including a driven shaft (14) through which the rotational axis of the cam means extends, and gear means (22-23a) drivingly connecting the driven shaft to the coil holder for orbital movement thereof about the driven shaft.

30. The machine as defined in claim 29 wherein said sensor means includes an externally toothed disk (23b) connected to the coil holder and rotatable therewith about the rotational axis thereof, a signal generating detector (28) mounted on the cam means in close radially spaced relation to the toothed disk, and a contact ring (19b) electrically connected to the detector through which rotation sensing signals are transmitted.

31. The machine as defined in claim 28 wherein said sensor means includes an externally toothed disk (23b) connected to the coil holder and rotatable therewith about the rotational axis thereof, a signal generating detector (28) mounted on the cam means in close radially spaced relation to the toothed disk, and a contact ring (19b) electrically connected to the detector through which rotation sensing signals are transmitted.

32. The machine as defined in claim 2 wherein said presser tool means includes a cap (64), a pivoted arm (60) mounted on the frame, and actuating lever means (62) connected to the arm for displacement of the cap between a lowered position on the coil holder and a retracted position.

33. The machine as defined in claim 32 wherein the presser tool means further includes an annular insulating liner (67) in the cap (64) engageable with the winding coils during flow of electrical heating current therethrough, said wire from which the coils are formed having an insulating resin sheathing softened by the heating current to interconnect the coils at locations in contact with the liner under pressure of the cap.

* * * * *